United States Patent [19]

Schad

[11] Patent Number: 4,660,801

[45] Date of Patent: Apr. 28, 1987

[54] MOLD CORE INCLUDING EJECTION SLEEVE

[75] Inventor: Robert D. Schad, Toronto, Canada

[73] Assignee: Husky Injection Molding Systems Ltd., Bolton, Canada

[21] Appl. No.: 811,114

[22] Filed: Dec. 19, 1985

[51] Int. Cl.$^4$ .................... B29C 39/26; B29C 39/36; B29C 45/26

[52] U.S. Cl. .................................. 249/66 A; 249/122; 249/175; 425/556; 425/437; 425/DIG. 15

[58] Field of Search ................ 425/437, 556, DIG. 5, 425/DIG. 15; 249/122, 177, 175, 63, 66 A

[56] References Cited

U.S. PATENT DOCUMENTS

| | | | |
|---|---|---|---|
| 4,125,246 | 11/1978 | Von Holdt | 425/437 |
| 4,438,065 | 3/1984 | Brown | 264/335 |
| 4,570,897 | 2/1986 | Von Holdt | 425/DIG. 5 |

Primary Examiner—Willard E. Hoag
Attorney, Agent, or Firm—Bachman & LaPointe

[57] ABSTRACT

A mold core for ejecting a cup-shaped workpiece including a core base, a core cap fixedly engaged with said core base and a core sleeve seated on the core base and engageable with said core cap. A fluid ejection channel is formed at the interface of the core base and core sleeve for ejecting gaseous fluid to the peripheral surface of the mold core.

10 Claims, 4 Drawing Figures

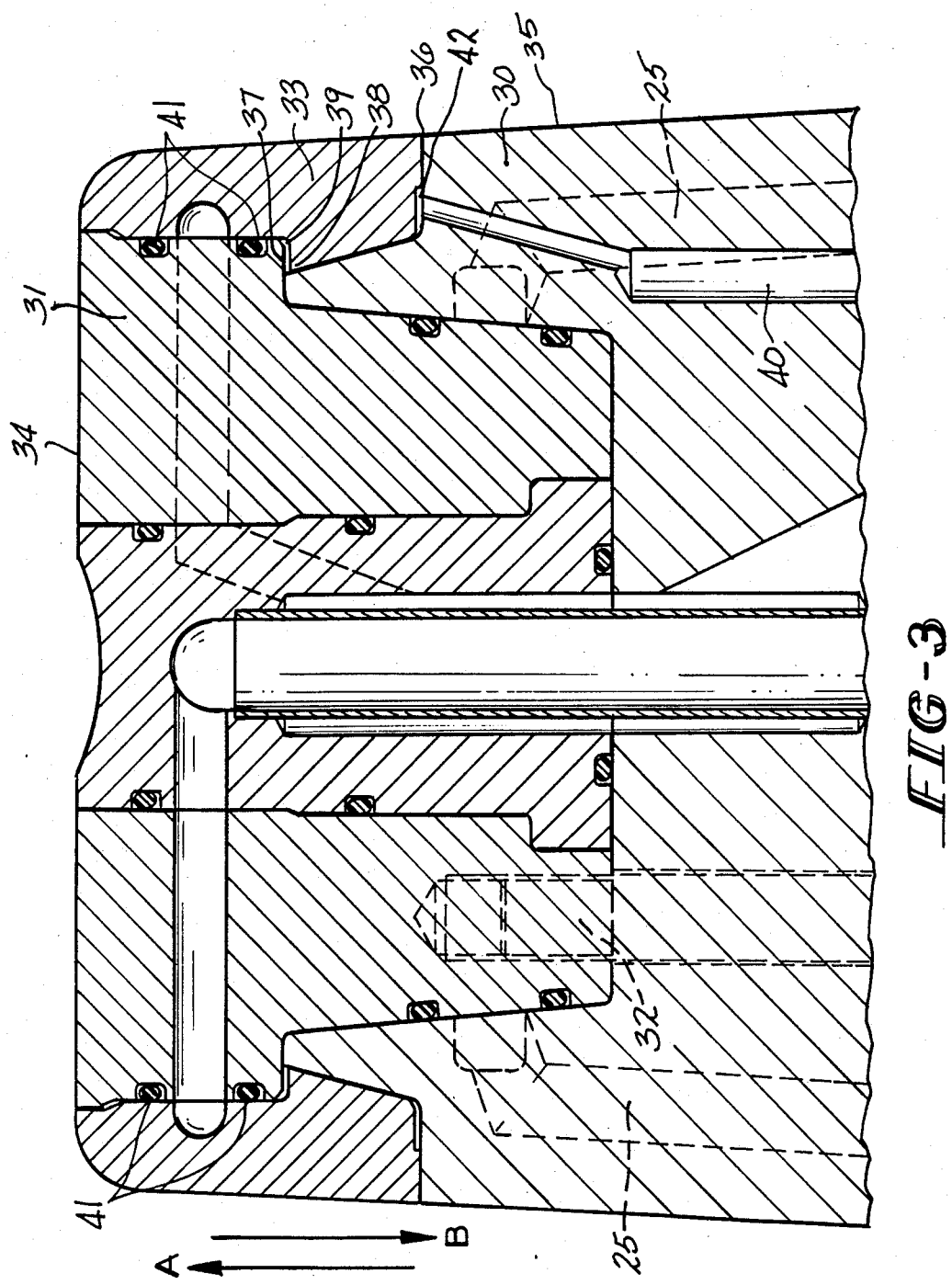

MOLD CORE INCLUDING EJECTION SLEEVE

BACKGROUND OF THE INVENTION

Container molding techniques have encouraged the use of light-weight containers in order to save on material costs and to obtain faster molding cycles. Naturally, as the containers become lighter in weight, the wall thickness diminishes and problems are encountered in the rapid ejection from the molds.

U.S. Pat. Nos. 4,179,254 and 4,438,065 show conventional methods for ejecting cup-shaped workpieces with closed front ends using stripper rings supplemented by venting holes, slots or air valves in the mold core to break the vacuum created between the core and the molded part or workpiece during ejection and to prevent collapsing of the workpiece.

The use of stripper rings to eject the container by pressing on its rim requires that the container be reasonably stiff so that it can be stripped off the core without buckling or even "folding over itself" like the finger of a tight-fitting glove during removal.

However, the demand for such stiffness to facilitate removal of the container from the core implies greater wall thickness, stiffer rather than easy-flowing materials, and longer cooling time. Any one of these factors contributes to slower cycles and higher costs.

An obvious answer to this difficulty, and one often attempted, has been to increase the air supply through the air vents or valves within the core designed to "blow" the workpieces off the core. This is sometimes successful especially with shallow workpieces and with strongly tapered ones that have a significant difference between top and bottom diameters. However, this method has not been satisfactory for deeper containers, particularly when their peripheral walls are nearly cylindrical, i.e. with a very small draft angle. In such cases, the air pressure inside the container tends to stretch its closed front end or bottom and thereby tighten the grip of the container on the core. The plastic may even burst at the cup bottom.

The use of vents or valves within the core is subject to other disadvantages, some of which are referred to in U.S. Pat. No. 4,438,065 and include the Venturi effect caused by the air escaping at the cup bottom and blowing out through the gap between the core and workpiece, problems with multi-cavity molds and other difficulties.

A significant disadvantage in the use of vents or valves relates to the problem of fixed vents. In order to prevent the plastic resin from entering and blocking the vents during the injection segment of the molding cycle, it is necessary to make the size of the fixed vents very small, in the order of 0.0005" to 0.001". Not only does this require extremely accurate and expensive machining of the component parts, but during the operation of the mold the air which will issue from the vents must first be filtered to prevent blocking of the vents by foreign particles carried through the mold to the vent. Naturally, filtering of the air is an operation of additional expense.

Accordingly, it is a principal object of the present invention to provide an improved mold core for ejecting a cup-shaped workpiece.

It is a further object of the present invention to provide an improved mold core as aforesaid which permits rapid ejection of workpieces, which does not require extremely accurate and expensive machining and does not incur the risk of preferential fill or vent blocking with its attendant problems.

Further objects and advantages of the present invention will appear hereinbelow.

SUMMARY OF THE INVENTION

In accordance with the present invention it has now been found that the foregoing objects and advantages may be readily obtained. The mold core of the present invention comprises: a core base; a core cap fixedly engaged with said core base; a core sleeve seated on said core base and engageable with said core cap, said core cap, core base and core sleeve forming a peripheral surface for molding a cup-shaped workpiece thereon, said sleeve being moveable between a forward position and a rearward position; a fluid ejection channel formed at the interface of said core base and core sleeve for ejecting gaseous fluid to said peripheral surface having an open position defined by forward movement of said core sleeve and a closed position defined by rearward movement of said core sleeve; fluid channel means communicating with said fluid ejection channel; and means for limiting the forward movement of said core sleeve. The means for limiting the forward movement of the core sleeve is engageable with said core sleeve and preferably comprises a ledge on the core cap engageable with a flange on the core sleeve.

Means are provided for opening the fluid ejection channel and for closing the fluid ejection channel. Preferably, the fluid ejection channel is opened by fluid pressure operative on said fluid ejection channel through the fluid channel means. Preferably, the fluid ejection channel is closed by the pressure of incoming molten material flowing over the core sleeve.

Thus, it can be readily seen that the mold core of the present invention is simple of construction and is easily and readily operated in a rapid cycle. The mold core of the present invention does not require expensive and high tolerance machining and is not subject to the disadvantage of preferential fill or blocking from incoming material.

BRIEF DESCRIPTION OF THE DRAWINGS

The above and other features of the present invention will be more readily apparent from a consideration of the accompanying partly schematic drawings in which:

FIG. 3 is an enlarged sectional view of the mold core with the fluid ejection channel in the closed position; and FIG. 4 is an enlarged sectional view showing the fluid ejection channel in the open position.

DETAILED DESCRIPTION

Figure 1:
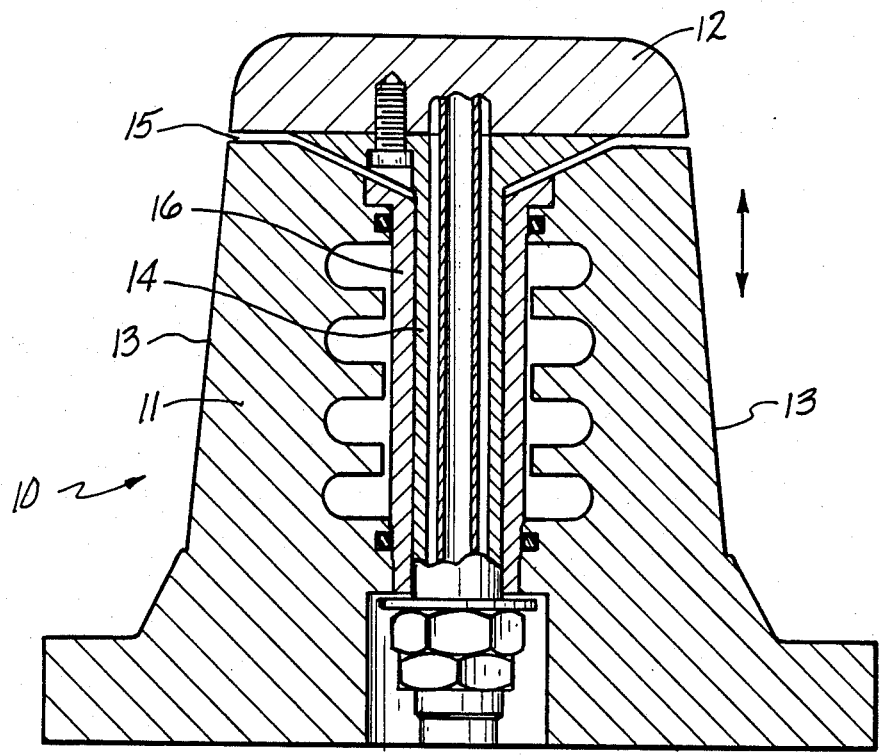
FIG. 1 is a sectional view of a conventional mold core.
Figure 2:
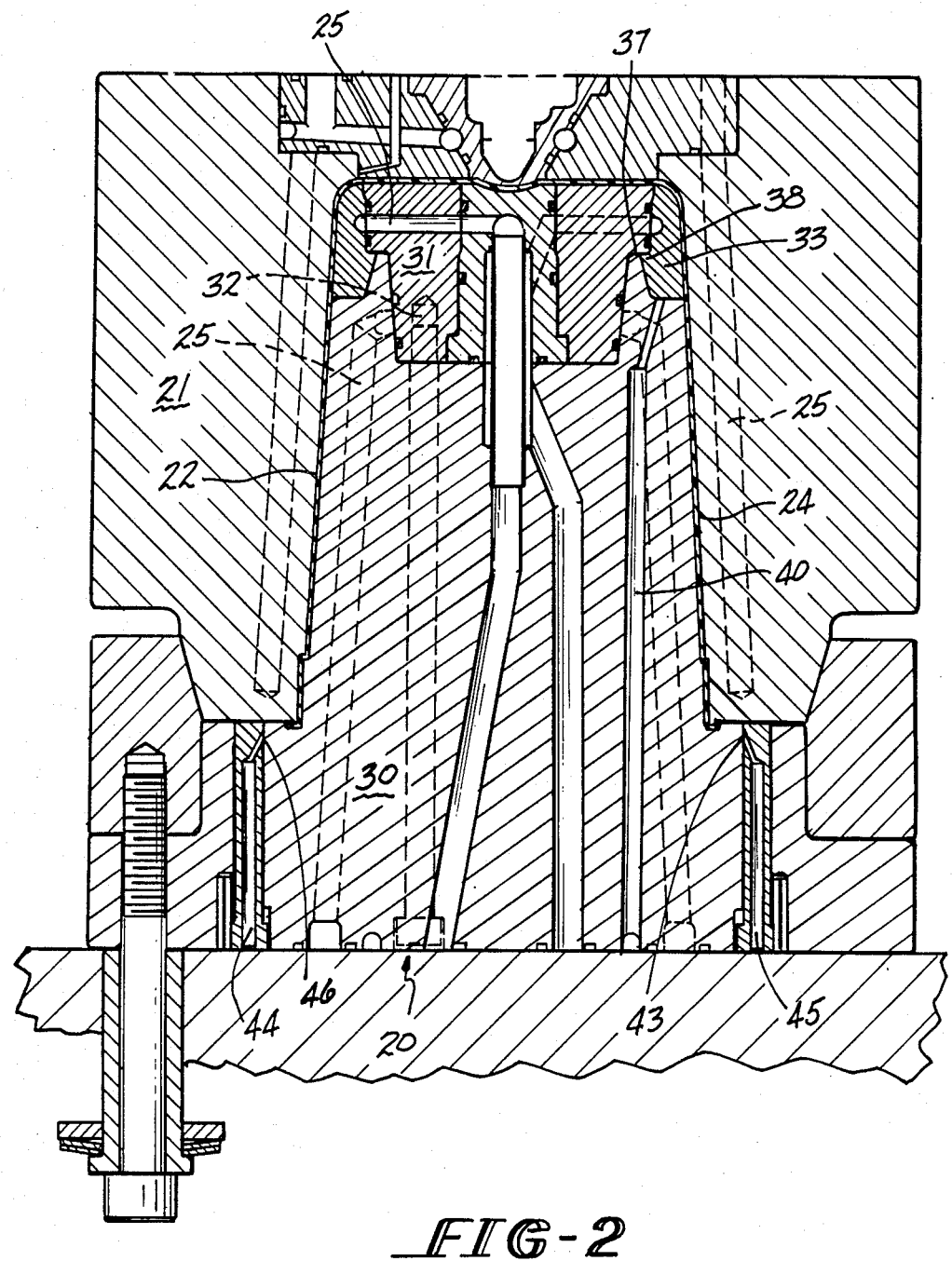
FIG. 2 is a section view of the mold core of the present invention including the adjacent portions of the mold and the molded article, wherein the mold and mold core are in the closed or engaged position.

Referring to FIG. 1, a tapering mold core 10 is illustrated having a base portion 11 and a cap portion 12. Mold core 10 forms a peripheral surface having tapered sidewalls 13 for injection molding a cup-shaped workpiece thereon as shown in FIG. 2. As shown in FIG. 1, mold core 10 includes a central shaft 14 which slides in bush 16. Central shaft 14 is actuated by fluid pressure to lift cap portion 12 spacing the cap portion 12 from base portion 11 by a predetermined amount corresponding to a predetermined valve stroke and exposing an air vent 15 located on sidewalls 13 at the interface between base 11 and cap 12. At the completion of the cycle the cap portion 12 is closed by the incoming plastic of the next shot to close air vent 15. The cap portion is moved in the direction of the arrow shown in FIG. 1. When air vent 15 is opened, air or other fluid is permitted to escape and eject the formed part from the core. Naturally, fluid supply means are provided communicating with the air vent 15. Also, coolant supply means are provided for cooling the core.

A disadvantage of this method is that it introduces moving parts into the core construction which will wear or which may deflect under the extreme injection pressure used in the injection segment of the molding cycle. As shown in FIG. 1, cap portion 12 is guided by central shaft 14 which slides within bush 16. In order for the shaft to slide some clearance must exist between the bush and the slide. This clearance may be very small, but will allow the core cap to shift sideways out of axial alignment with the core base during injection. If this occurs a preferential filling of the mold cavity will occur. The incoming plastic resin will tend to flow down that side of the core which offers the least resistance, that is, down the side from which the core cap has moved. This preferential fill will cause an imbalance of injection pressure to be exerted against the side of the core, which in turn will further aggravate the condition of preferential fill.

FIGS. 2, 3 and 4 illustrate the mold core of the present invention. Referring to FIG. 2, mold core 20 engages mold cavity element 21 to form an injection cavity 22 therebetween. Injection nozzle (not shown) is provided communicating with injection cavity 22 for injecting molten plastic into the injection cavity to form a cup-shaped workpiece 24 with a closed front end on mold core 20. Mold cavity element 21 and mold core 20 are relatively moveable into and out of engagement with each other in the direction of the arrow in FIG. 2 in order to free the workpiece 24 for ejection after injection molding. Naturally, both mold core 20 and mold cavity element 21 may be supplied with coolant passageways 25 for introduction of coolant therein by suitable means, not shown.

As shown in FIGS. 2 and 3, mold core 20 includes a core base 30 and a core cap 31 fixedly engaged with the core base by any suitable means, as by fastening means 32. It is preferred that the core base 30 and core cap 31 be separate pieces as shown. Core sleeve 33 is provided seated on core base 30. Core sleeve 33 surrounds and is engageable with the core cap 31. The core cap 31, core sleeve 33 and core base form a peripheral surface for molding of a cup-shaped workpiece. Core 20 has a front face 34 defined at least in part by core cap 31 and including core sleeve 33, and tapered sidewalls 35 defined at least in part by core sleeve 33 and including core base 30.

Core sleeve 33 is moveable in an axial direction concentric with the axis of mold core 20 between a forward position shown in FIG. 4 in the direction of arrow A in FIG. 3 and a rearward position shown in FIG. 3 in the direction of arrow B in FIG. 3. Fluid ejection channel 36 is formed at the interface of core base 30 and core sleeve 33 on tapered sidewalls 35 for ejecting gaseous fluid, e.g., air, to the peripheral surface of core 20 at tapered sidewall 35. Fluid ejection channel 36 has an open position shown in FIG. 4 defined by forward movement of core sleeve 33, and a closed position shown in FIG. 3 defined by rearward movement of core sleeve 33.

Means are provided for limiting the forward movement of core sleeve 33 and thereby defining the size of fluid ejection channel 36. Thus, core cap 31 has a rearwardly facing ledge 37 for limiting the forward movement of sleeve 33 engageable with forwardly facing flange 38 on sleeve 33. Space 39 is provided between ledge 37 and flange 38 when sleeve 33 is in the closed position. Flange 38 moves forward through space 39 until engagement with ledge 37 opening channel 36 by an amount corresponding to space 39.

Fluid channel means 40 connected to a source of gaseous fluid (not shown) are provided containing gaseous fluid communicating with fluid ejection channel 36. Groove 42 is provided between core sleeve 33 and core base 30 when the sleeve is in the closed position communicating with fluid channel means 40. Sealing means 41 are provided between core cap 31 and core sleeve 33 to prevent leakage of cooling fluid in contact with the core sleeve.

Air vents 46 and 43 are provided adjacent the core base 30 connected to a source of fluid pressure (not shown) via passageways 44 and 45 to aid in ejection of the workpiece.

The sequence of operation is as follows. After injection of the plastic resin into mold cavity 22 to form workpiece 24, pressurized air enters fluid channel means 40 and fills groove 42. The pressure acts on the base of core sleeve 33 urging it forward in the direction of arrow A. As the sleeve moves forward fluid ejection channel 36 opens allowing some of the pressurized air to escape. The forward motion of the sleeve also pushes the molded part off the core and in the direction of arrow A. Air escaping from fluid ejection channel 36 now exerts pressure on the workpiece urging its sidewalls away from the peripheral surface of the core. This action frees the workpiece 24 from core 20 and facilitates complete ejection by secondary ejection means on core 20, if used, such as air vents 46 and 43. Naturally, a variety of such secondary ejection means may be used if desired.

Core sleeve 33 is restricted in its forward movement by ledge 37 in the manner described hereinabove. Thus, after ejection of the workpiece 24 and engaging mold cavity element 21 and mold core 20 to form injection cavity 22 the core sleeve 33 will not contact mold cavity element 21. After mold cavity element 21 and mold core 20 engage to start the next cycle the air supply to all vents is stopped. Core sleeve 33 is thus left at its forward position so that upon injection of the molten plastic into injection cavity 22, the pressure of the plastic flowing over core sleeve 33 causes the sleeve to move rearwardly in the direction of arrow B, thus closing fluid ejection channel 36 as shown in FIG. 3 before the plastic can reach and enter fluid ejection channel 36. After sufficient cooling time has been allowed the air is once again introduced into fluid channel means 40 and the cycle repeated.

This invention may be embodied in other forms or carried out in other ways without departing from the spirit or essential characteristics thereof. The present embodiment is therefore to be considered as in all respects illustrative and not restrictive, the scope of the invention being indicated by the appended claims, and all changes which come within the meaning and range of equivalency are intended to be embraced therein.

What is claimed is:

1. A mold core for ejecting a cup-shaped workpiece which comprises: a core base; a core cap fixedly engaged with said core base; a core sleeve seated on said core base and engageable with said core cap, said core cap, core base and core sleeve forming a peripheral surface for molding a cup-shaped workpiece thereon, said sleeve being moveable between a forward position and a rearward position relative to said cap; a fluid ejection channel formed at the interface of said core base and core sleeve for ejecting gaseous fluid to said peripheral surface having an open position defined by forward movement of said core sleeve and a closed position defined by rearward movement of said core sleeve; a fluid channel means communicating with said fluid ejection channel; and means for limiting the forward movement of said core sleeve.

2. A mold core according to claim 1 wherein said means for limiting the forward movement of said core sleeve comprises a ledge on said core cap engageable with a flange on said core sleeve.

3. A mold core according to claim 1 including a groove communicating with said fluid ejection channel and fluid channel means.

4. A mold core according to claim 1 including means for opening said fluid ejection channel and means for closing said fluid ejection channel.

5. A mold core according to claim 4 wherein said means for opening said fluid ejection channel comprises fluid pressure operative on said fluid ejection channel through said fluid channel means.

6. A mold core according to claim 4 wherein said means for closing said fluid ejection channel comprises the pressure of incoming molten material flowing over said core sleeve.

7. A mold core according to claim 1 wherein said mold core has a front face defined at least in part by said core cap and tapered sidewalls defined at least in part by said core sleeve and wherein said fluid ejection channel is located on said sidewalls.

8. A mold core according to claim 7 wherein said front face includes the core sleeve and the tapered sidewalls include said core base.

9. A mold core according to claim 1 wherein the core sleeve surrounds the core cap.

10. A mold core according to claim 1 including secondary ejection means on said mold core.

* * * * *